United States Patent
Memory

(10) Patent No.: US 7,509,915 B2
(45) Date of Patent: Mar. 31, 2009

(54) CYCLONE ASSISTED PRODUCT DELIVERY SYSTEM FOR SOIL OPENERS

(75) Inventor: Russell J. Memory, Saskatoon (CA)

(73) Assignee: CNH Canada, Ltd. (CA)

(*) Notice: Subject to any disclaimer, the term of this patent is extended or adjusted under 35 U.S.C. 154(b) by 199 days.

(21) Appl. No.: 11/564,100

(22) Filed: Nov. 28, 2006

(65) Prior Publication Data

US 2008/0121154 A1 May 29, 2008

(51) Int. Cl.
*A01C 7/00* (2006.01)
*A01C 9/00* (2006.01)
*A01C 15/00* (2006.01)

(52) U.S. Cl. .................. 111/174; 111/200; 111/900

(58) Field of Classification Search ......... 111/170–188, 111/200, 900
See application file for complete search history.

(56) References Cited

U.S. PATENT DOCUMENTS

| | | | |
|---|---|---|---|
| 3,964,639 A | 6/1976 | Norris et al. | |
| 4,002,266 A | 1/1977 | Beebe | |
| 4,493,273 A | 1/1985 | Gauchet et al. | |
| 4,669,922 A | 6/1987 | Hooper et al. | |
| 4,899,672 A | 2/1990 | Paul | |
| 5,392,722 A | 2/1995 | Snipes et al. | |
| 5,522,328 A | 6/1996 | Long | |
| 6,148,748 A | 11/2000 | Bardi et al. | |
| 6,267,067 B1 | 7/2001 | Mayerle et al. | |
| 6,505,569 B1 | 1/2003 | Richard | |
| 2002/0100400 A1 | 8/2002 | Meyer | |

OTHER PUBLICATIONS

John Deere, D-Cup Diffuser 'Floating' Style Mounting Instructions, no date.

*Primary Examiner*—Christopher J. Novosad
(74) *Attorney, Agent, or Firm*—Rebecca Henkel

(57) ABSTRACT

A pneumatic agricultural product delivery system configured to reduce the velocity of agricultural product entering a furrow is disclosed. The system includes at least one product supply chamber, a furrow opening device configured to engage the ground to create a furrow, a plurality of tubes providing an interior passage extending from the product supply chamber to a cyclone rigidly mounted to the tool bar. A pneumatic pressure source is pneumatically coupled to the interior passage to supply pressurized air to the interior passage to move product within the interior passage and a product placement tube extends from an outlet of the cyclone to a location adjacent the furrow opening device.

19 Claims, 4 Drawing Sheets

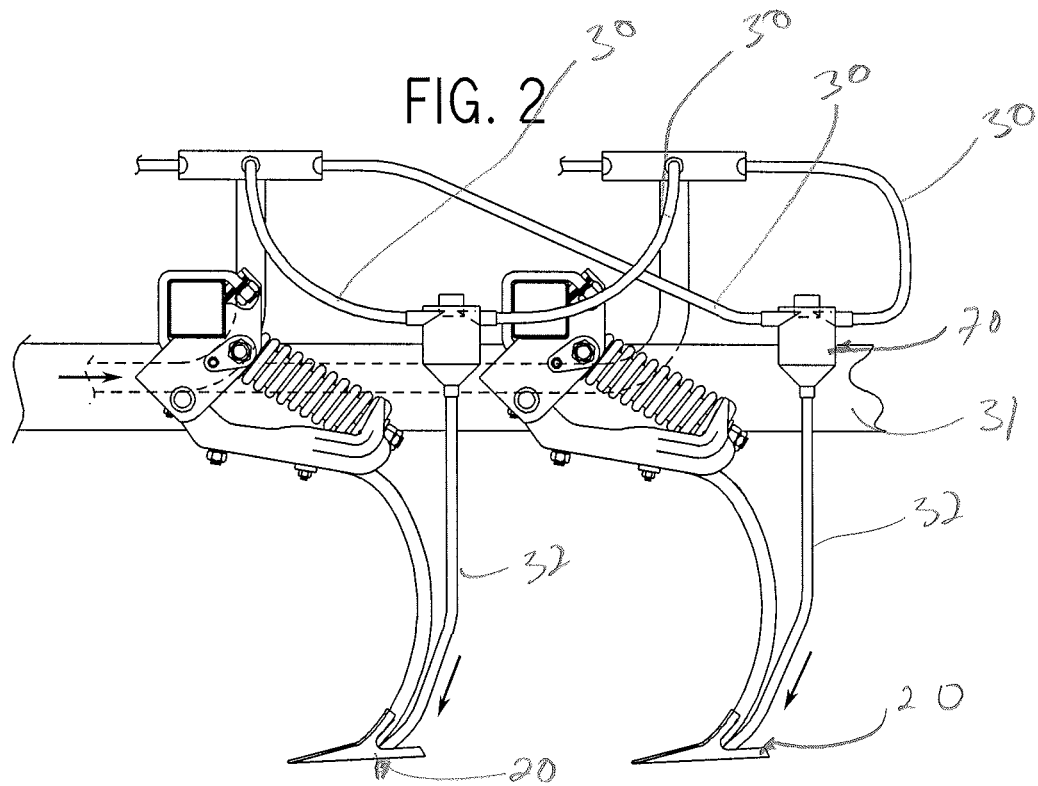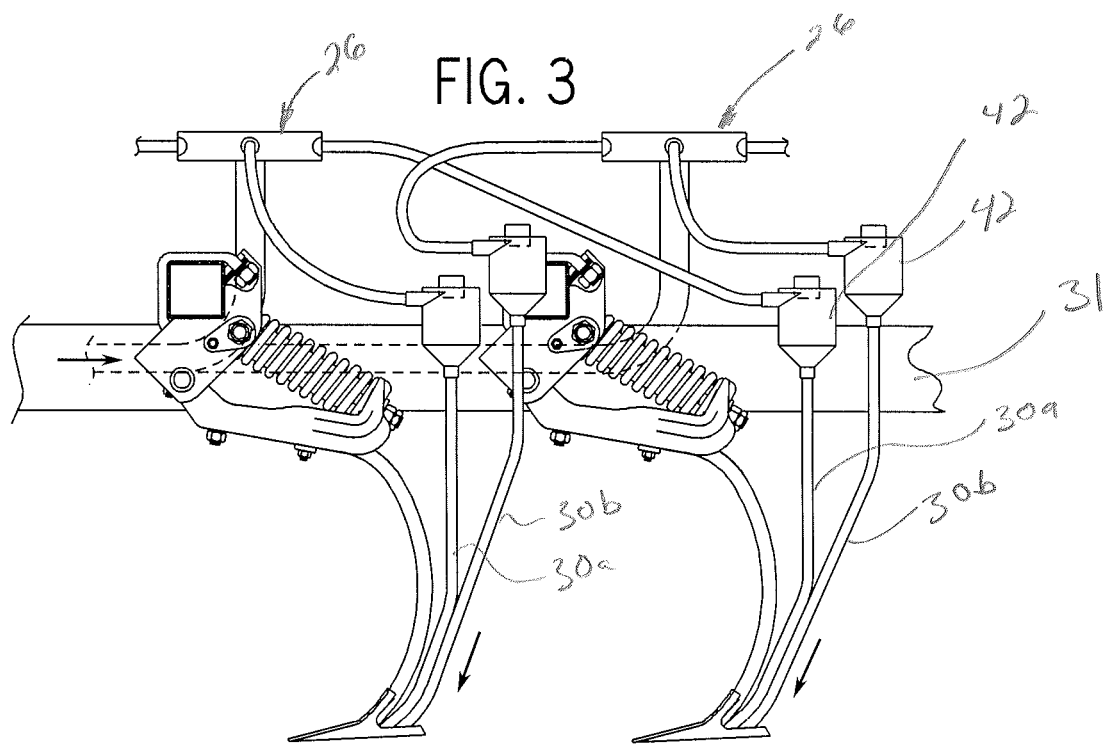

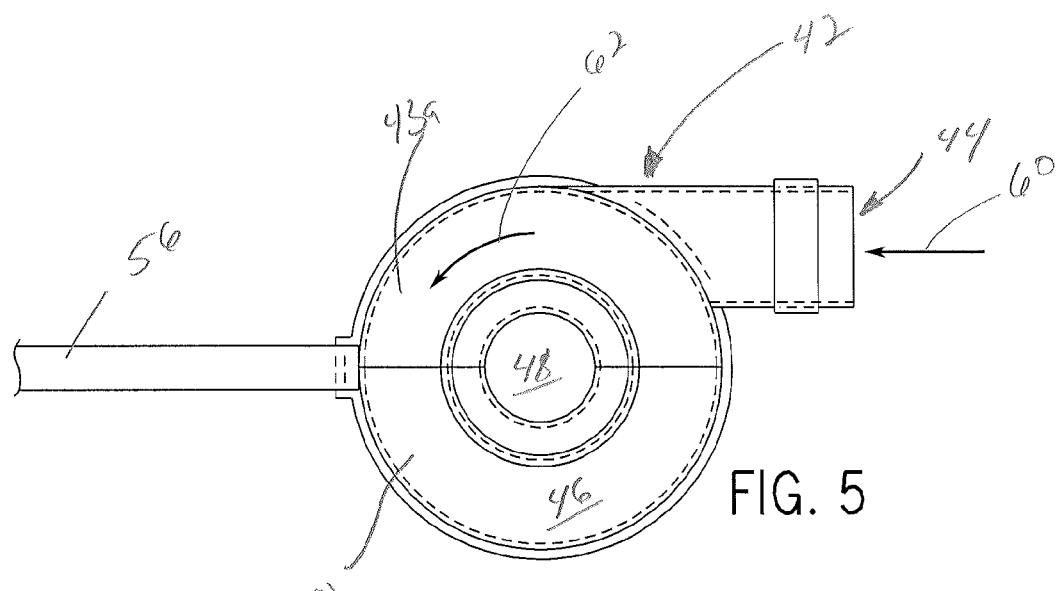
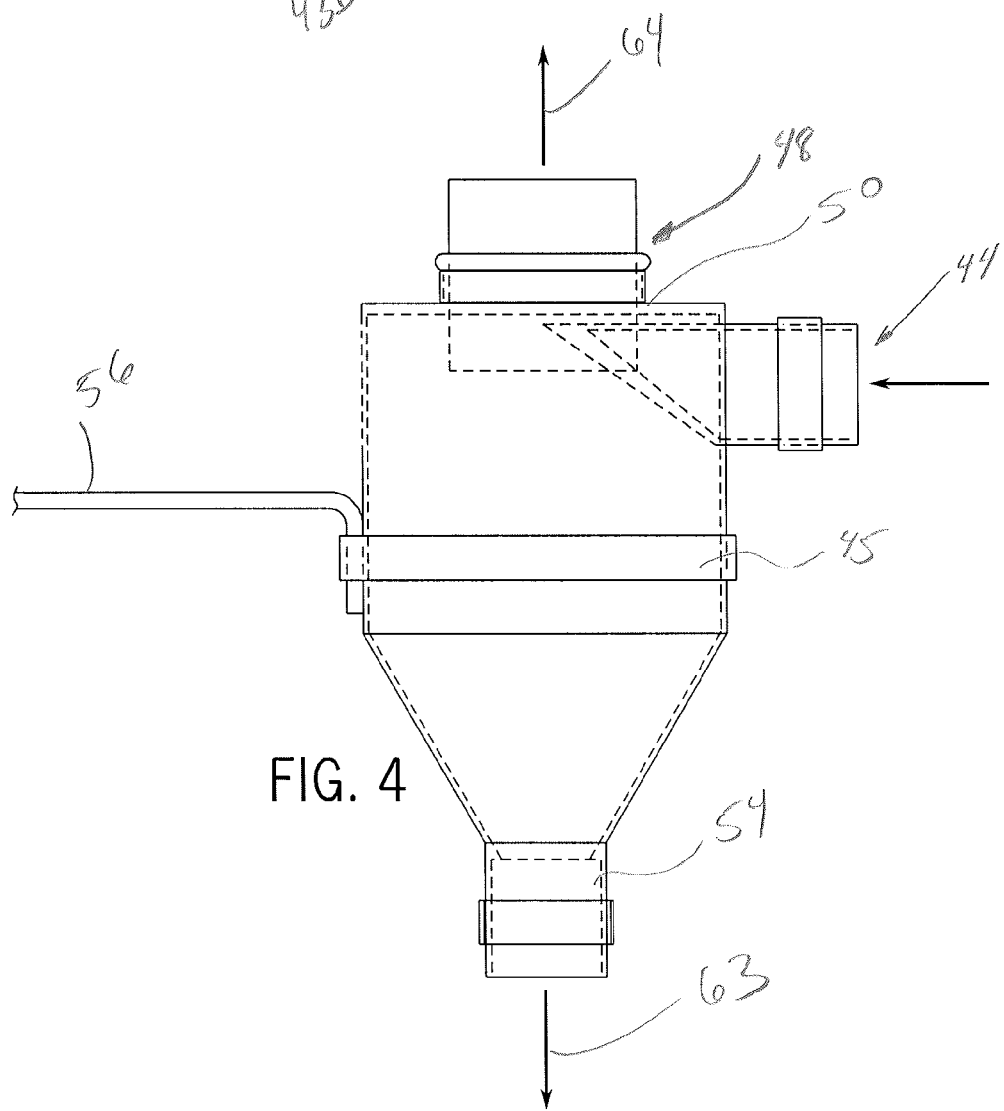

CYCLONE ASSISTED PRODUCT DELIVERY SYSTEM FOR SOIL OPENERS

RELATED APPLICATIONS

Not applicable.

BACKGROUND OF THE INVENTION

1. Field of the Invention

This invention relates generally to agricultural planting equipment, such as air seeders, and, more particularly, to an agricultural product delivery system and method for reducing the speed of an agricultural product such as seed and/or fertilizer entrained in an air stream of the conveying lines of the agricultural product delivery system. Even more particularly, the present invention relates to a cyclone for use with an agricultural product delivery system to eliminate the velocity of product in the air stream of the agricultural product delivery system.

2. Discussion of the Related Art

Conventional planters typically include a series of evenly spaced row planter units connected to an implement frame or tool bar so as to be towed across a field. The row planter units are generally configured to plant particulate product (i.e., seed, herbicide, pesticide, fertilizer, etc.) in evenly spaced individual rows. The planter is usually towed by a propelling vehicle such as a tractor or other prime mover across the field. In many conventional planters, a pneumatic conveying or product delivery system is used to move agricultural product from a supply unit or hopper to the ground. The operating steps typically include, using a plowshare or other furrow opening device to break the ground and cut a furrow, moving the seeds pneumatically into the furrow by means of a conduit located immediately behind the plowshare and then covering the furrow.

Pneumatic agricultural product delivery systems utilize pressurized air to assist in the delivery and movement of particulate material or product such as fertilizer, seed, insecticide or herbicide from a product supply chamber to a growing medium, such as soil. Such pneumatic agricultural particulate material delivery systems are commonly employed in planters, drills and a variety of other agricultural implements. Known pneumatic agricultural product delivery systems typically use pressurized air to move the product through an interior passage provided by a series of elongate tubes which extend from the product supply chamber or hopper to an outlet adjacent to the soil. The series of tubes typically includes an upper flexible hose or tube connected to the product supply chamber and a lower seed tube connected to the upper flexible tube and supported adjacent to the soil. The lower seed tube is typically supported adjacent to a furrow opening disk and includes a funnel-shaped end through which the product flows and is deposited into the newly formed narrow furrow.

Although pneumatic delivery systems enable a more controlled delivery of product to the growing medium, such pneumatic delivery systems are not without problems. For example, in many pneumatic delivery systems, the high velocity of the air stream causes the product to bounce or to be blown out of the furrow. As a result, the accuracy of product placement is reduced and/or extremely difficult to predict or control.

There have been previous attempts at curing the above noted problems. Different forms of retarding or braking devices are known in the industry. For example, some prior art devices utilize a venting system to enable pressurized air to escape as it approaches the soil opener. Other devices both release air and attempt to slow the product velocity with deflectors. For example, some systems include a seed brake wherein a kinked tube having a relatively large air opening on the inner curved side of the tube above the kink is spliced between the upper tube and the lower tube. Despite some improvement in reducing the velocity of the product, none of the prior solutions has provided a fully acceptable solution. Both the prior art venting systems and the deflecting systems do not provide predictable results.

One attempt at providing a solution to the problem of increased seed velocity is described in U.S. Pat. No. 4,493,273 to Gauchet et al. the disclosure of which is hereby incorporated by reference. The system described in the Gauchet patent utilizes a single inlet free floating cyclone. The planting assembly includes a tubular support arm for carrying a plowshare and for conveying seeds pneumatically. The front end of the tubular support arm is connected to a supply of air entrained seeds. The rear end of the tubular support is connected to a cyclone separator for separating the seeds which proceed through a conduit to the furrow cut by the plowshare. While the above described invention was somewhat satisfactory for its intended purpose, the invention exhibits numerous drawbacks. For example, the cyclone is not rigidly mounted to the frame of the planter. As a result, the rugged movement of the planting device across a rough field affects the performance of the cyclone. In addition, due to the cyclone's location, at or near the plowshare, the cyclone is mounted roughly at a 45° angle in relation to the ground. As a result, the full affect of the cyclone cannot be appreciated.

In addition, none of the known prior art systems take into consideration the necessity of planting a mixed product from multiple conveying lines, and effectively eliminating the unwanted spread of the mixed product via a single reducing device. When planting a field it is not uncommon that more than one product stream is directed into the furrow to be planted simultaneously. In many cases, each product is metered into the same delivery line. Unfortunately, these products are seldom applied at the same rate so their speed through the delivery lines are rarely, if ever, the same. As a result, the concentration of particular products in a mixture becomes inconsistent.

Furthermore, none of the prior art systems provide a cyclone that can be used to diffuse air velocity and wherein the air flow and reduction of air pressure can be adjusted. All of the known prior art systems provide a cyclone that cannot be adjusted. This is problematic because higher concentrations or rates typically imply higher transfer velocities and greater air velocities. The prior art non-adjustable cyclones are limited because the same velocity reducing device design does not necessarily function uniformly under these diverse conditions. Therefore it is desirable to have a cyclone which can be adjusted to respond to varying conditions.

Therefore, there is a continuing need for a pneumatic agricultural product delivery system wherein predictable behavior can be achieved to effectively release all air and bring the vertical velocity of the product to zero at some point above the soil opener. There is a an additional need for such a system that can receive multiple conveying lines and be adjusted or controlled to respond to different operating condition. There is a need for such a system that does not require additional parts, which does not require additional space, which minimizes or prevents the escape of particulate material prior to the particulate material reaching the soil, and/or which minimizes the damage caused by the escape of corrosive particulate material.

SUMMARY OF THE INVENTION

The present invention provides a pneumatic agricultural product delivery system, a pressure reducing device for a pneumatic agricultural product delivery system and a method of reducing pneumatic pressure in an agricultural product delivery system that addresses the drawbacks described above. The pneumatic agricultural product delivery system of the invention utilizes a cyclone to receive the agricultural product and air and reduces the air velocity in the delivery line to near zero. As a result, the product leaves the cyclone with an effective vertical velocity of zero. The cyclone of the system of the invention is also simple in design and parts for ready manufacturability.

In a first embodiment of the present invention, a pneumatic agricultural product delivery system includes at least one product supply chamber, a furrow opening device configured to engage the ground to create a furrow, and a plurality of tubes providing an interior passage extending from the product supply chamber to at least one cyclone. The pneumatic pressure source is pneumatically coupled to the interior passage to supply pressurized air to the interior passage to move product within the interior passage. A product placement tube extends from an outlet of the pressure reducing device to a location adjacent the furrow opening device.

In the preferred embodiment of the system, the cyclone is rigidly mounted to a tool bar of an agricultural device such that the cyclone outlet is orientated in a position perpendicular to the ground. In one embodiment of the system, the cyclone comprises more than one inlet for receiving tubes from at least two product supply chambers. In an alternative embodiment of the system, two product placement tubes extend from at least two cyclones to a single location adjacent the furrow opening device.

In another embodiment of the system, the air flow though the cyclones can be adjusted. Preferably, the air flow is adjusted via movement of an exhaust tube extending out of the cyclone.

In another embodiment, the present invention provides a pressure reducing device for a pneumatic agricultural product delivery system. The pressure reducing device includes at least one cyclone rigidly mounted to a tool bar of an agricultural device. The cyclone is connected at one end to at least one tube providing an interior passage extending from at least one product supply chamber to the cyclone. The cyclone is further connected to a product placement tube extending from the cyclone to a location adjacent a furrow opening device. In the preferred embodiment of the device, the cyclone is rigidly mounted to the tool bar such that a cyclone outlet is orientated in a position perpendicular to the ground.

In one embodiment of the device, the cyclone comprises more than one inlet for receiving tubes from at least two product supply chambers. In an alternative embodiment of the system, two product placement tubes extend from at least two cyclones to a single location adjacent the furrow opening device. In another embodiment of the system, the air flow though the cyclones can be adjusted. Preferably, the air flow is adjusted via movement of an exhaust tube extending out of the cyclone.

In a final embodiment, a method of reducing pneumatic pressure in an agricultural product delivery system includes, rigidly attaching at least one cyclone to a tool bar of an agricultural device, connecting at least one tube between the cyclone and at least one product supply chamber and connecting a product placement tube to the cyclone, such that the product placement tube extends to a location adjacent a furrow opening device. The method may further include the step of positioning said at least one cyclone on the tool bar such that a cyclone outlet is orientated in a position perpendicular to the ground or connecting at least two tubes between the cyclone and at least two product supply chambers. In another embodiment, the method includes the step of adjusting the amount of air flow though the cyclone.

Other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 2 is a schematic of a row planter unit employing a double shoot cyclone in accordance with the present invention.

FIG. 3 is a schematic of a row planter unit employing two single shoot cyclones supplying different product to a single furrow opening device in accordance with the present invention.

FIG. 4 illustrates a plan view of the single shoot cyclone of the row planter unit shown in FIG. 1.

FIG. 5 illustrates a top plan view of the single shoot cyclone of the row planter unit shown in FIG. 1.

DETAILED DESCRIPTION OF THE PREFERRED EMBODIMENTS

Figure 1:
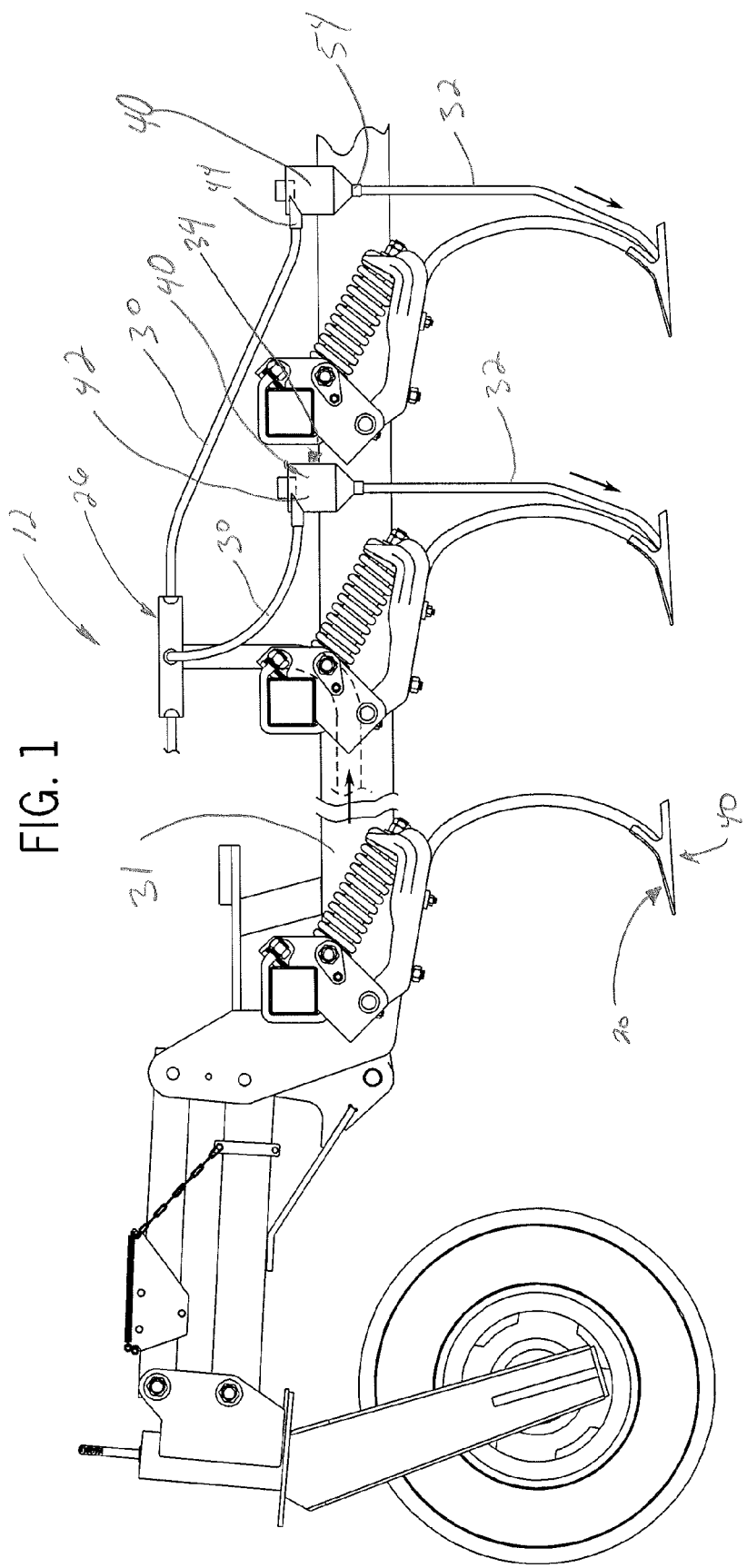
FIG. 1 illustrates a fragmentary side elevational view of a row planter unit employing a single shoot cyclone in accordance with the present invention.

FIG. 1 illustrates an agricultural product delivery system 12 in accordance with the present invention in combination with an agricultural seeding or planting machine. Delivery system 12 delivers agricultural product, such as seed, fertilizer, herbicide or insecticide to a growing medium, such as soil, as delivery system 12 is moved across a field. Delivery system 12 generally includes furrow opening device 20, at least one agricultural product supply chamber 26, at least one product delivery tube 30 extending between the product supply chamber 26 and a pressure reducing device 34, at least one outlet tube or product placement tube 32 extending from the pressure reducing device 34 to the furrow opening device 20, and a pneumatic pressure source (not shown).

Furrow opening device 20 is supported for engagement with soil on a tool bar 31 as is known in the art. It should be understood that the furrow opening device 20 could be a vide variety of conventionally known implements and is configured to create a trough or furrow in soil in which the agricultural material or product is deposited. For example, furrow opening device 20 could be any one of a variety of alternative furrow opening devices or mechanism depending upon the type of product being delivered to soil. For example, furrow opening device 20 may comprise one or more furrow opening disks or coulters or may comprise a conventionally known shank opener or sweep.

Although not shown in detail, product supply chamber 26 comprises a chamber or volume configured to store particulate material such as seed, fertilizer, and herbicide or insecticide prior to delivery to soil. Product supply chamber 26 may have various sizes, shapes and configurations. For example, product supply chamber 26 may comprise an interior hopper of an air drill cart such as the Concord 3400, 2400, 2300 and 1100 Air System or may comprise a bin or hopper such as employed on planters. Moreover, supply chamber 26 may be configured to hold mixtures of different kinds of particulate material or multiple products. Product supply chamber 26 is preferably coupled to a particulate material metering device (not shown) by tube, line or passageway.

As is known in the art, particulate material metering devices receive product from supply chamber 26 and meters out the product to delivery tubes 30 at a controlled rate. The particulate material metering device may have any of a variety of conventionally known configurations as well as locations. For example, particulate material metering device may comprise a conventionally known metering flute such as employed in Concord air systems. Alternatively, metering device may comprise an air drum or a plate metering system.

Product delivery tubes 30 extend from supply chamber 26 to the pressure reducing devices 34. Product placement tubes or outlet tubes 32 extend from the pressure reducing devices to a location adjacent the furrow opening devices 20. Product delivery tubes 30, pressure reducing devices 34 and product placement tubes 32 provide an interior passage from supply chamber 26 to an outlet 40 adjacent the furrow opening device 20 and adjacent to furrow. As noted, the movement of the product from the supply chamber 26 through product delivery tube 30 is assisted by pressurized air supplied by pneumatic pressure source (not shown).

As is known in the art, the pneumatic pressure source is pneumatically coupled to the interior passage of product delivery tubes 30, either directly or indirectly. In addition to assisting with the movement of product through the product delivery tubes 30, pneumatic pressure source may also supply pressurized air to particulate material metering device (not shown) such as with a positive pressure seed metering drum or such as with a negative pressure plate metering device. The pneumatic pressure source preferably comprises a blower powered by a motor such as a hydraulic motor or a diesel motor. When delivery system 12 is employed with an air system cart having a hopper, the pneumatic pressure source also supplies pressurized air to each hopper to maintain the pressure inside the hopper or product supply chamber 26 equal to that of the air stream within the product delivery tube 30.

As illustrated in FIGS. 1-7, a pressure reducing device 34, in particular a cyclone 40, is connected to the end of product delivery tube 30 at an inlet 44 on the cyclone 40 and to a product placement tube 32 at outlet 54. Cyclone 40 is preferably rigidly mounted to the tool bar 31 by straps 56 or other securing device as shown in FIGS. 4 and 5. The cyclone 40 receives the product and pressurized air being transferred within the product delivery tube 30. The cyclone 40 reduces the air velocity from the product delivery tube 30 to near zero as the pressurized air is released out of exhaust tube 48 extending out of the cyclone 40. As a result, the product exits the cyclone 40 through outlet 54 and product placement tube 32, having an effective vertical velocity of zero.

FIGS. 1, 3, 4 and 5 illustrate a single shoot cyclone 42. Although a wide variety of alternative designs could be utilized, in the illustrated embodiment, the single shoot cyclone 42 includes a body 41, constructed from two mating halves 43a, 43b joined together by a strap 45 or other securing device. Single shoot cyclone 42 includes a single inlet 44 for receiving a single product delivery tube 30. A circular airway 46 extends from inlet 44 around the inner edge the cyclone body 41. Extending out of the top of the single shoot cyclone 42 is an adjustable exhaust tube 48 configured to slidably fit within an opening 50 on the top of the single shoot cyclone 42 and provide a discharge for the pressurized air received from the product delivery tube 30. Exhaust tube 48 includes a rim 49 around its outer periphery to prevent insertion beyond a certain predetermined critical point.

As illustrated by the arrow 60 in FIG. 5, pressurized air and product enter the single shoot cyclone 42 through inlet 44. Arrow 62 shows the product continuing around the interior of the single shoot cyclone 42 as the pressurized air, shown by arrow 64, escapes out of exhaust tube 48. As the pressurized air exits the exhaust tube 48, the product loses it velocity and exits the single shoot cyclone 42 through outlet 54 and into product placement tube 32 with an effective vertical velocity of zero. The path of the product out of the single shoot cyclone is shown by arrow 63.

As previously noted, the single shoot cyclone 42 is adjustable. The exhaust tube 48 is configured to slidably fit within an opening 50 on the top of the single shoot cyclone 42. Preferably, the exhaust tube 48 on the single shoot cyclone 42 can be adjusted from a fully engaged position to numerous other partially engaged positions. As a result, the adjustable exhaust tube 48, allows some of the air pressure to be preserved in the system 12, if desired. For example, by sliding the exhaust tube 48 out of the single shoot cyclone 42, less of the air exits the single shoot cyclone 42, less pressure is reduced, resulting in greater product velocity as it leaves the single shoot cyclone 42.

As illustrated by the schematics shown in FIGS. 1 and 3, the single shoot cyclone 42 can be employed in a variety of ways on a planter or other farm implement. For example, FIG. 1 shows a single shoot cyclone 42 in a single shoot application. In a single shoot application, each single shoot cyclone 42 is rigidly mounted to a tool bar 31 and receives product from a single product delivery tube 30. Once the pressure is reduced within the single shoot cyclone 42, the product travels to the furrow opening device 20 within product placement tube 32. As illustrated in FIG. 1, each furrow opening device 20, receives only a single product placement tube.

As illustrated in FIG. 3, the single shoot cyclone 42 can also be employed in a double shoot application. During the double shoot application, each single shoot cyclone 42 is once again rigidly mounted to a tool bar 31 and receives product from a single product delivery tube 30. However, in the double shoot application, once the pressure is reduced within the cyclone, two or more product delivery tubes 30a, 30b from separate cyclones 42 converge at a single furrow opening device 20. As a result, separate agricultural product from separate product chambers 26 may be delivered to the furrow opening device 20 simultaneously.

Figures 6, 7:
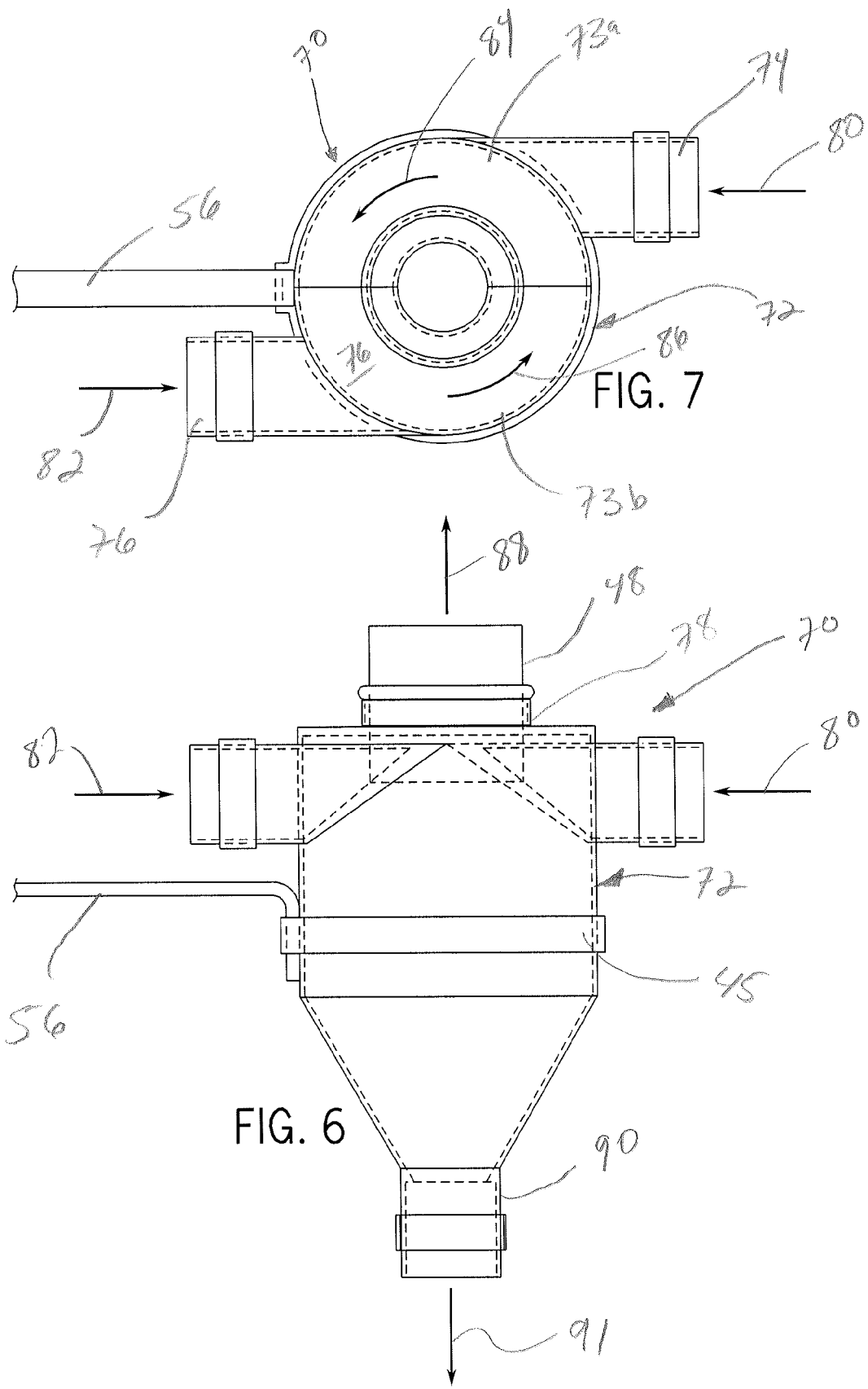
FIG. 6 illustrates a plan view of the double shoot cyclone of the row planter unit shown in FIG. 2.
FIG. 7 illustrates a top plan view of the double shoot cyclone of the row planter unit shown in FIG. 2.

FIGS. 2, 6 and 7 illustrate a double shoot cyclone 70. As discussed below, double shoot cyclone 70 functions in a substantially similar manner as the single shoot cyclone 42, but allows for multiple products to be mixed or blended within the double shoot cyclone, as opposed to at or near the furrow opening device 20. It should be understood that while a double shoot cyclone 70 is illustrated, other multiple inport cyclones, such at three or four inport cyclones etc., are within the scope of the invention. Although a wide variety of alternative designs could be utilized, in the illustrated embodiment, the double shoot cyclone 70 includes a body 72, constructed from two mating halves 73a, 73b joined together by a strap 45 or other securing device. Double shoot cyclone 70 includes first inlet 74 and second inlet 76 for receiving discrete product delivery tubes 30. A circular airway 76 extends around the inner edge the cyclone body 72. Extending out of the top of the double shoot cyclone 70 is an adjustable exhaust tube 48 identical to that previously described. Exhaust tube 48 is configured to slidably fit within an opening 78 on the top of the double shoot cyclone 70 and provide a discharge for the pressurized air received from the product delivery tube 30.

As illustrated by the arrows 80 and 82 in FIG. 7, pressurized air and product enter the double shoot cyclone 70 through inlets 74 and 76. Arrows 84 and 86 show the path of travel of the product around the interior of the double shoot cyclone 70. As the air and product move through the double shoot cyclone 70, the pressurized air, shown by arrow 88, escapes out of exhaust tube 48. As the pressurized air exits the exhaust tube 48, the product exits the double shoot cyclone 70 through outlet 90 as indicated by arrow 91 and into product placement tube 32 with an effective vertical velocity of zero.

As noted above, the double shoot cyclone 70 is adjustable. The exhaust tube 48 is configured to slidably fit within an opening 50 on the top of the double shoot cyclone 70. Preferably, the exhaust tube 48 on the double shoot cyclone 70 can be adjusted from a fully engaged position to numerous other partially engaged positions. The adjustable exhaust tube 48, allows some of the air pressure to be preserved, if desired. For example, by sliding the exhaust tube 48 out of the double shoot cyclone, less of the air pressure is reduced, resulting in greater product velocity as it leaves the double shoot cyclone 70.

As illustrated by the schematic shown in FIG. 2, the double shoot cyclone 70 can be employed to provide a blended product to a furrow opening device 20 from a single cyclone. As illustrated in FIG. 2, each double shoot cyclone 70 is rigidly mounted to a tool bar 31 and receives product from two discrete product delivery tubes 30. The two product delivery tubes 30 may be connected to two different agricultural products such as fertilizer and seed. Once the products are delivered to the cyclone 70 they are mixed during their natural path though the double shoot cyclone 70 and exit the cyclone at outlet 90 in a mixed state. The mixed product is then delivered to the furrow opening device by product placement tube 32.

It should be appreciated that in some applications the agricultural product delivery system 12 may additionally includes a furrow closing device (not shown) as in known in the art. The furrow closing device, for example, could be located on an opposite side of outlet 40 with respect to furrow opening device 20. Such a furrow closing device could be configured to engage the soil to move soil so as to fill and close furrow with soil above the deposited agricultural product as is known in the art.

As noted above the agricultural product delivery system could be used with a wide variety of farm implements. For example and as known in the art, a tractor could pull an air till drill system including the agricultural product delivery system 12. The air till drill system would typically include a drill and cart. The drill would include a tool bar or frame supported by wheels while cart would include a main frame also supported by wheels. The drill and cart are each conventionally known except for the cyclone and material placement tube 32.

Examples of carts and agricultural particulate material metering devices are set forth and described with respect to in for example U.S. Pat. No. 5,915,312, the full disclosure of which is hereby incorporated by reference.

Many changes and modifications could be made to the invention without departing from the spirit thereof. The scope of these changes will become apparent from the appended claims.

I claim:

1. A pneumatic agricultural product delivery system comprising:
    at least one product supply chamber;
    a furrow opening device configured to engage the ground to create a furrow;
    at least one pressure reducing device comprising a body having an opening on top, an outlet on bottom of said body and an inlet extending tangentially to radius of one side of said body; wherein product and air rotates toward an inner wall of body within pressure reducing device;
    an adjustable exhaust tube extending from said opening on top of said body configured to slide within the opening of said pressure reducing device; wherein air speed is adjustable;
    a plurality of tubes providing an interior passage extending from at least one product supply chamber to at least one inlet of said pressure reducing device, wherein a pneumatic pressure source is pneumatically coupled to the interior passage to supply pressurized air to the interior passage to move product within the interior passage;
    a product placement tube extending from said outlet of the pressure reducing device to a location adjacent the furrow opening device; and
    wherein said pressure reducing system comprises at least one cyclone.

2. The pneumatic agricultural product delivery system of claim 1, wherein the at least one cyclone is rigidly mounted to a tool bar of an agricultural device.

3. The pneumatic agricultural product delivery system of claim 2, wherein said at least one cyclone is rigidly mounted to said tool bar such that said cyclone outlet is orientated in a position perpendicular to the ground.

4. The pneumatic agricultural product delivery system of claim 1, wherein said cyclone comprises more than one inlet for receiving tubes from at least two product supply chambers.

5. The pneumatic agricultural product delivery system of claim 1, wherein said at least one cyclone comprises two inlets for receiving tubes from two product supply chambers.

6. The pneumatic agricultural product delivery system of claim 1, wherein at least two product placement tubes extend from at least two cyclones to a single location adjacent the furrow opening device.

7. The pneumatic agricultural product delivery system of claim 1, wherein an air flow though the at least one cyclone can be adjusted.

8. The pneumatic agricultural product delivery system of claim 7, wherein an air flow though the at least one cyclone is adjusted via movement of an exhaust tube extending out of the cyclone.

9. A pressure reducing device for a pneumatic agricultural product delivery system comprising:
    at least one cyclone having a body with an opening on top, an outlet on bottom of said body and an inlet extending tangentially to radius of one side of said body configured to be rigidly mounted to a tool bar of an agricultural device; wherein product and air rotates within an inner wall of said body of said pressure reducing device;

at least one tube connected to said inlet of said cyclone providing an interior passage extending from at least one product supply chamber to said cyclone; and a product placement tube connected to said cyclone and extending from the cyclone to a location adjacent a furrow opening device.

10. The pressure reducing device for a pneumatic agricultural product delivery system of claim 9, wherein said at least one cyclone is rigidly mounted to said tool bar such that a cyclone outlet is orientated in a position perpendicular to the ground.

11. The pressure reducing device for a pneumatic agricultural product delivery system of claim 9, wherein said cyclone comprises at least two inlets for receiving tubes from at least two product supply chambers.

12. The pressure reducing device for a pneumatic agricultural product delivery system of claim 9, wherein said at least one cyclone comprises two inlets for receiving tubes from two product supply chambers.

13. The pressure reducing device for a pneumatic agricultural product delivery system of claim 9, wherein an air flow though the at least one cyclone can be adjusted.

14. The pressure reducing device for a pneumatic agricultural product delivery system of claim 9, wherein an air flow though the at least one cyclone is adjusted via movement of an adjustable exhaust tube extending out of the cyclone.

15. A method of reducing pneumatic pressure in an agricultural product delivery system, said method comprising:

rigidly attaching at least one cyclone having a body with an opening on top, an outlet on bottom of said body and an inlet extending tangentially to radius of one side of said body to a tool bar of an agricultural device;

moving air and product to an interior wall of said body of said cyclone;

connecting at least one tube between inlet of said cyclone and at least one product supply chamber, said tube providing an interior passage extending from said at least one product supply chamber and said cyclone; and connecting a product placement tube to said cyclone, said product placement tube extending to a location adjacent a furrow opening device.

16. The method of reducing pneumatic pressure in an agricultural product delivery system according to claim 15, further comprising positioning said at least one cyclone on said tool bar such that a cyclone outlet is orientated in a position perpendicular to the ground.

17. The method of reducing pneumatic pressure in an agricultural product delivery system according to claim 15, further comprising connecting at least two tubes between said cyclone and at least two product supply chambers.

18. The method of reducing pneumatic pressure in an agricultural product delivery system according to claim 15, further comprising adjusting an amount of air flow though the at least one cyclone.

19. The method of reducing pneumatic pressure in an agricultural product delivery system according to claim 18, wherein the step of adjusting an amount of air flow is performed via movement of an adjustable exhaust tube extending out of the cyclone.

\* \* \* \* \*